US012434472B2

(12) United States Patent
Toyofuku et al.

(10) Patent No.: US 12,434,472 B2
(45) Date of Patent: Oct. 7, 2025

(54) EJECTION STATE DETERMINATION METHOD, EJECTION STATE DETERMINATION APPARATUS, AND NON-TRANSITORY COMPUTER-READABLE STORAGE MEDIUM STORING EJECTION STATE DETERMINATION PROGRAM

(71) Applicant: SEIKO EPSON CORPORATION, Tokyo (JP)

(72) Inventors: Atsushi Toyofuku, Shiojiri (JP); Toshiro Murayama, Fujimi (JP)

(73) Assignee: SEIKO EPSON CORPORATION (JP)

( * ) Notice: Subject to any disclaimer, the term of this patent is extended or adjusted under 35 U.S.C. 154(b) by 217 days.

(21) Appl. No.: 18/341,817

(22) Filed: Jun. 27, 2023

(65) Prior Publication Data

US 2023/0415477 A1 Dec. 28, 2023

(30) Foreign Application Priority Data

Jun. 28, 2022 (JP) ................................ 2022-103309

(51) Int. Cl.
*B41J 2/045* (2006.01)
*B41J 2/21* (2006.01)

(52) U.S. Cl.
CPC ....... *B41J 2/04536* (2013.01); *B41J 2/04586* (2013.01)

(58) Field of Classification Search
CPC .................................................... B41J 2/04561
See application file for complete search history.

(56) References Cited

U.S. PATENT DOCUMENTS 6,575,550 B1 * 6/2003 Steinfield ............... B41J 2/0456 347/19
2002/0060819 A1 * 5/2002 Nara .................... H04N 1/4072 358/518
2007/0275470 A1 * 11/2007 Duff ...................... B01L 3/0268 436/55
2010/0045731 A1 * 2/2010 Kim ..................... B41J 2/04561 347/19
2020/0282659 A1 * 9/2020 Lan ....................... B29C 64/245
2021/0229420 A1 7/2021 Murayama et al.
2022/0381666 A1 * 12/2022 Gopalkrishna ......... B22F 10/85

FOREIGN PATENT DOCUMENTS

JP 2021-115725 A 8/2021

* cited by examiner

*Primary Examiner* — Shelby L Fidler
(74) *Attorney, Agent, or Firm* — Harness, Dickey & Pierce, P.L.C.

(57) ABSTRACT

An ejection state determination method for determining an ejection state of a liquid ejecting head in which a plurality of nozzles for ejecting a liquid in a first direction are arranged in a second direction intersecting the first direction. The ejection state determination method includes a first obtaining step of obtaining a plurality of pieces of multi-valued data of an image including a plurality of pixels by capturing, at one timing, an image of a droplet ejected from one nozzle selected from the plurality of nozzles, and a second obtaining step of obtaining determination information from the plurality of pieces of multi-valued data.

17 Claims, 9 Drawing Sheets

FIG. 7

D4

| | |
|---|---|
| NUMBER OF PIXELS | 22 |
| VOLUME | 138.16 |
| ASPECT RATIO | 1.25 |
| AVERAGE PIXEL VALUE | 17.27 |
| STANDARD DEVIATION | 8.62 |
| KURTOSIS | −0.27 |
| SKEWNESS | 0.25 |

EJECTION STATE DETERMINATION METHOD, EJECTION STATE DETERMINATION APPARATUS, AND NON-TRANSITORY COMPUTER-READABLE STORAGE MEDIUM STORING EJECTION STATE DETERMINATION PROGRAM

The present application is based on, and claims priority from JP Application Serial Number 2022-103309, filed Jun. 28, 2022, the disclosure of which is hereby incorporated by reference herein in its entirety.

BACKGROUND

1. Technical Field

The present disclosure relates to an ejection state determination method, an ejection state determination apparatus, and a non-transitory computer-readable storage medium storing an ejection state determination program.

2. Related Art

In a typical liquid ejecting device such as an ink jet printer, a liquid, such as ink, is ejected from nozzles generally by application of drive pulses to driving elements, such as piezoelectric elements. For use for design or adjustment of such a liquid ejecting apparatus, ejection characteristics, such as the ejection amount or ejection characteristics of ink from nozzles, are measured in some cases.

For example, JP-A-2021-115725 describes that an ejection velocity or ejection characteristics including the ejection velocity are measured, and the waveform of a drive pulse is determined based on a measurement result.

In some cases, deviations in ejection angle, ejection velocity, or the like among a plurality of nozzles occur and therefore impair the stability of ink ejection from a liquid ejecting head, resulting in a defect such as unevenness or white spots in the obtained image. The index for evaluating the occurrence of such defects as the ejection characteristics of a liquid ejecting head is ejection stability.

For example, JP-A-2021-115725 discloses a measurement method for an ejection angle. In the measurement method, a liquid is ejected on a recording medium, and the distortion in ejection direction is estimated based on the amount of deviation along the sheet direction from the ideal landing position of dots that have landed on a recording medium and the distance in the height direction between a liquid ejecting head and the recording medium. When the measurement method is performed for each nozzle, the deviation in ejection angle among nozzles may be evaluated as one of the elements regarding the ejection stability.

However, the measurement method may evaluate only the ejection angle. To evaluate, for example, the ejection velocity or non-ejection in addition to the ejection angle, another method is to be used. This imposes a burden in terms of man-hours or ink consumption.

SUMMARY

An ejection state determination method according to an aspect of the present disclosure is an ejection state determination method for determining an ejection state of a liquid ejecting head in which a plurality of nozzles for ejecting a liquid in a first direction are arranged in a second direction intersecting the first direction. The ejection state determination method includes a first obtaining step of obtaining a plurality of pieces of multi-valued data of an image including a plurality of pixels by capturing, at one timing, an image of a droplet ejected from one nozzle selected from the plurality of nozzles, and a second obtaining step of obtaining determination information from the plurality of pieces of multi-valued data.

An ejection state determination apparatus according to another aspect of the present disclosure is an ejection state determination apparatus for determining an ejection state of a liquid ejecting head in which a plurality of nozzles for ejecting a liquid in a first direction are arranged in a second direction intersecting the first direction. The ejection state determination apparatus includes a first obtainer configured to obtain a plurality of pieces of multi-valued data of an image including a plurality of pixels by capturing, at one timing, an image of a droplet ejected from one nozzle selected from the plurality of nozzles, and a second obtainer configured to obtain determination information from the plurality of pieces of multi-valued data.

A non-transitory computer-readable storage medium storing an ejection state determination program according to another aspect of the present disclosure is a non-transitory computer-readable storage medium storing an ejection state determination program for determining an ejection state of a liquid ejecting head in which a plurality of nozzles for ejecting a liquid in a first direction are arranged in a second direction intersecting the first direction. The ejection state determination program causes a computer to execute a first obtaining step of obtaining a plurality of pieces of multi-valued data of an image including a plurality of pixels by capturing, at one timing, an image of a droplet ejected from one nozzle selected from the plurality of nozzles, and a second obtaining step of obtaining determination information from the plurality of pieces of multi-valued data.

BRIEF DESCRIPTION OF THE DRAWINGS

FIG. 7 is a table illustrating exemplary determination information obtained in a second obtaining step.

DESCRIPTION OF EXEMPLARY EMBODIMENTS

Figure 1:
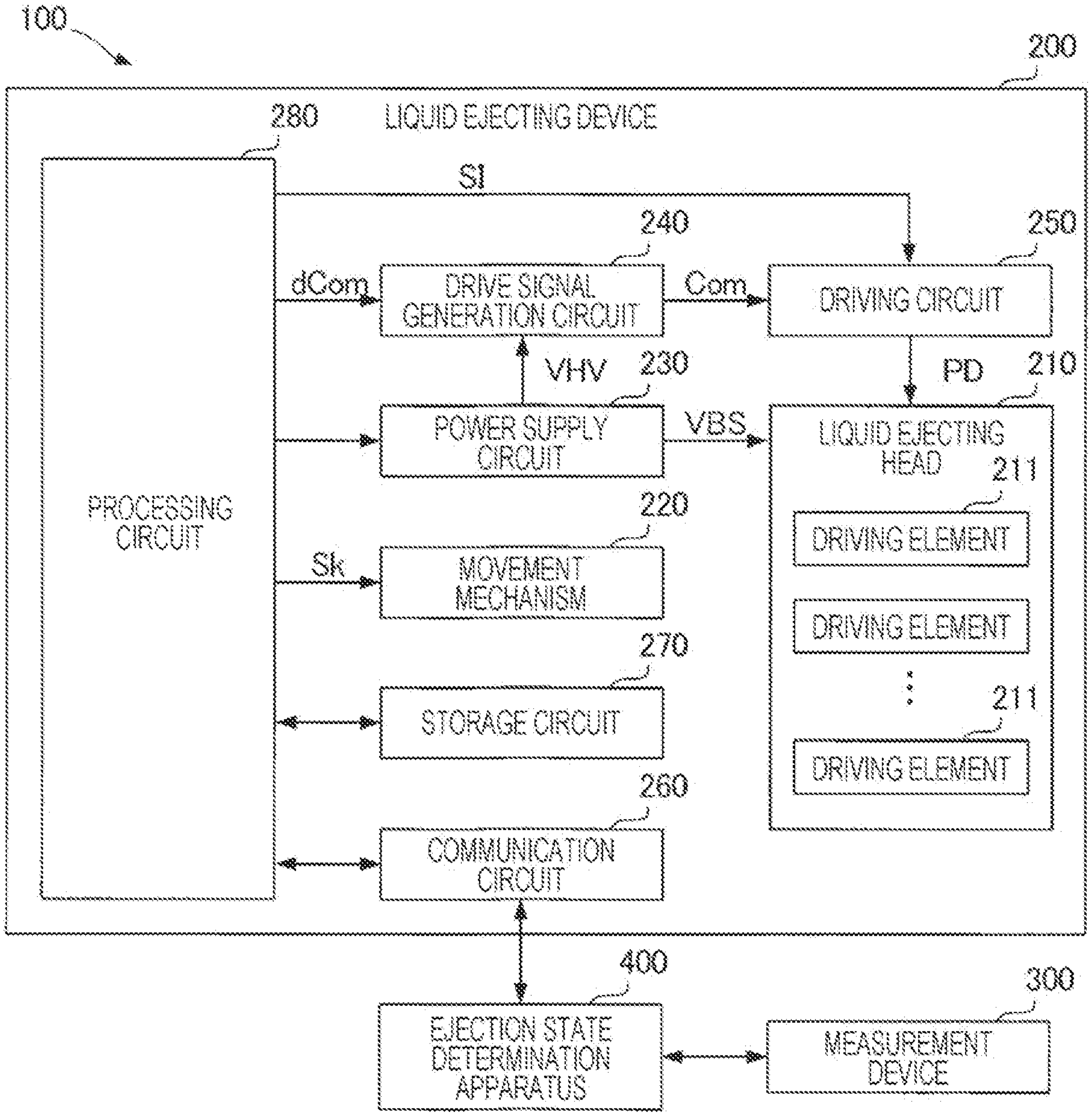
FIG. 1 is a diagram illustrating an exemplary configuration of a system including an ejection state determination apparatus according to an embodiment.

Embodiments according to the present disclosure will be described below with reference to the accompanying drawings. The dimensions and scales of elements in the drawings are appropriately different from actual ones, and some of the elements are schematically illustrated for ease of understanding. In addition, the scope of the present disclosure is not limited to these embodiments as long as there is no description in the following sections to the effect that the present disclosure is particularly limited.

1. System Including Ejection State Determination Apparatus

FIG. 1 is a diagram illustrating an exemplary configuration of a system 100 including an ejection state determination apparatus 400 according to an embodiment. The system 100 determines the ejection state of ink, which is an exemplary liquid.

As illustrated in FIG. 1, the system 100 includes a liquid ejecting device 200, a measurement device 300, and the ejection state determination apparatus 400.

The liquid ejecting device 200 is a printer that performs printing on a recording medium using an ink jet method. The recording medium is not limited as long as it enables the liquid ejecting device 200 to perform printing. Examples of the recording medium include various types of paper, various fabrics, and various films. The liquid ejecting device 200 may either be a serial printer or a line printer.

As illustrated in FIG. 1, the liquid ejecting device 200 includes a liquid ejecting head 210, a movement mechanism 220, a power supply circuit 230, a drive signal generation circuit 240, a driving circuit 250, a communication circuit 260, a storage circuit 270, and a processing circuit 280.

The liquid ejecting head 210 ejects ink toward a recording medium. FIG. 1 illustrates a plurality of driving elements 211 as components of the liquid ejecting head 210. The liquid ejecting head 210 includes, in addition to the driving elements 211, cavities for containing ink and nozzles communicating with the cavities, both of which are not illustrated in the figures. Here, each of the driving elements 211 is provided for a corresponding one of the cavities, and causes ink to be ejected from a nozzle corresponding to the cavity by changing the pressure of the cavity. The driving element 211 is, for example, a piezoelectric element that deforms a vibrating plate constituting part of the wall surface of a cavity, or a heater that heats ink in the cavity. The liquid ejecting head 210 may be referred to below simply as a head.

In the example illustrated in FIG. 1, the number of the liquid ejecting heads 210 included in the liquid ejecting device 200 is one; however, the number may be two or more. In this case, for example, two or more liquid ejecting heads 210 are combined into a unit. In the case where the liquid ejecting device 200 is of a serial type, the liquid ejecting head 210 or a unit including two or more liquid ejecting heads 210 is used such that a plurality of nozzles are distributed across a width direction portion of a recording medium. In contrast, in the case where the liquid ejecting device 200 is of a line type, the unit including two or more liquid ejecting heads 210 is used such that a plurality of nozzles are distributed across the entire area in the width direction of a recording medium.

The movement mechanism 220 changes a relative position between the liquid ejecting head 210 and a recording medium. More specifically, in the case where the liquid ejecting device 200 is of the serial type, the movement mechanism 220 includes a transport mechanism that transports a recording medium in a predetermined direction, and a movement mechanism that repetitively moves the liquid ejecting head 210 along an axis perpendicular to the transport direction of the recording medium. In addition, in the case where the liquid ejecting device 200 is of the line type, the movement mechanism 220 includes a transport mechanism that transports a recording medium in a direction intersecting the longitudinal direction of the unit including two or more liquid ejecting heads 210.

The power supply circuit 230 is supplied with power from a commercial power supply (not illustrated) and generates various predetermined potentials. The various potentials generated are suitably supplied to components of the liquid ejecting device 200. For example, the power supply circuit 230 generates a power supply potential VHV and an offset potential VBS. The offset potential VBS is supplied to, for example, the liquid ejecting head 210. In contrast, the power supply potential VHV is supplied to, for example, the drive signal generation circuit 240.

The drive signal generation circuit 240 is a circuit that generates a drive signal Com for driving each driving element 211 included in the liquid ejecting head 210. Specifically, the drive signal generation circuit 240 includes, for example, a digital-to-analog (DA) conversion circuit and an amplifying circuit. In the drive signal generation circuit 240, the DA conversion circuit converts a waveform specification signal dCom described later from the processing circuit 280 from the digital signal to an analog signal, and the amplifying circuit amplifies the analog signal using the power supply potential VHV from the power supply circuit 230, thereby generating the drive signal Com. Here, a signal having a waveform to be actually supplied to the driving elements 211, among waveforms included in the drive signal Com, is a drive pulse PD.

In accordance with a control signal SI described later, the driving circuit 250 switches between supply and non-supply of at least some of the waveforms included in the drive signal Com, as the drive pulse PD, to each of the plurality of driving elements 211. The driving circuit 250 is, for example, a circuit including a transmission gate.

The communication circuit 260 is a communication device communicatively connected to the ejection state determination apparatus 400. The communication circuit 260 includes, for example, a Universal Serial Bus (USB), local area network (LAN), or other interface. The communication circuit 260 may be, for example, wirelessly connected to the ejection state determination apparatus 400 using Wi-Fi, Bluetooth, or the like, or may be connected to the ejection state determination apparatus 400 via a LAN, the Internet, or the like. Wi-Fi and Bluetooth are registered trademarks.

The storage circuit 270 stores various programs that are executed by the processing circuit 280 and various types of data, such as print data, which are processed by the processing circuit 280. The storage circuit 270 includes, for example, semiconductor memories that are one or both of a volatile memory, such as a random access memory (RAM), and a nonvolatile memory, such as a read-only memory (ROM), an electrically erasable programmable ROM (EEPROM), or a programmable ROM (PROM). The print data is, for example, supplied from the ejection state determination apparatus 400. The storage circuit 270 may be configured as part of the processing circuit 280.

The processing circuit 280 has a function of controlling the operations of each component of the liquid ejecting device 200 and a function of processing various types of data. The processing circuit 280 includes, for example, one or more processors such as central processing units (CPUs). The processing circuit 280 may include a programmable logic device, such as a field-programmable gate array (FPGA), instead of or in addition to the CPUs.

The processing circuit 280 controls the operations of each component of the liquid ejecting device 200 by executing programs stored in the storage circuit 270. The processing circuit 280 generates control signals Sk and SI, the waveform specification signal dCom, and other signals as signals for controlling the operations of each component of the liquid ejecting device 200.

The control signal Sk is a signal for controlling the drive of the movement mechanism 220. The control signal SI is a signal for controlling the drive of the driving circuit 250. Specifically, the control signal SI specifies, at predetermined unit intervals, whether the driving circuit 250 is to supply the drive signal Com from the drive signal generation circuit 240 as the drive pulse PD to the liquid ejecting head 210. With this specification, for example, the ink amount ejected from the liquid ejecting head 210 is specified. The waveform specification signal dCom is a digital signal for defining the waveform of the drive signal Com generated in the drive signal generation circuit 240.

The measurement device 300 is a device for measuring the ejection characteristics of ink from the liquid ejecting head 210. Examples of the ejection characteristics include an ejection velocity, an ejection angle, an ejection amount, the number of satellites, and stability. The ejection characteristics of ink from the liquid ejecting head 210 may be referred to below simply as ejection characteristics.

The measurement device 300 in the present embodiment is an imaging device that captures an image of ink in flight that has been ejected from the liquid ejecting head 210. Specifically, the measurement device 300 includes, for example, imaging optics and an imaging element. The imaging optics are optics including at least one imaging lens, and may include various optical elements such as a prism, or may include a zoom lens, a focus lens, or the like. The imaging element is, for example, a charge coupled device (CCD) image sensor or a complementary metal oxide semiconductor (CMOS) image sensor. An imaging result of the imaging element is input to the ejection state determination apparatus 400, in which ejection characteristics are computed by arithmetic processing using the imaging result. Measurement of ejection characteristics using the measurement device 300 will be described in detail later with reference to FIG. 3.

The number of pixels of the imaging element is not limited as long as it is sufficient to enable identification of the location of a droplet DR as described later and to enable obtaining of the distribution of values of multi-valued data.

The ejection state determination apparatus 400 is a computer that controls operations of the liquid ejecting device 200 and the measurement device 300. The ejection state determination apparatus 400 is communicatively connected in a wireless or wired manner to each of the liquid ejecting device 200 and the measurement device 300. A communication network including a LAN or the Internet may be involved in the connection.

In particular, the ejection state determination apparatus 400 has a function of determining the ejection state of the liquid ejecting head 210 of the liquid ejecting device 200 described above. A result of the determination is, for example, used for design or adjustment of the liquid ejecting device 200 described later. Examples of the adjustment mentioned here include head selection, ink selection, design of waveforms of the drive pulse PD, and sequence design. In addition, processing such as cleaning based on a determination result may be performed. The configuration of the ejection state determination apparatus 400 will be described in detail later with reference to FIG. 3.

2. Measurement of Ejection Characteristics

Figure 2:
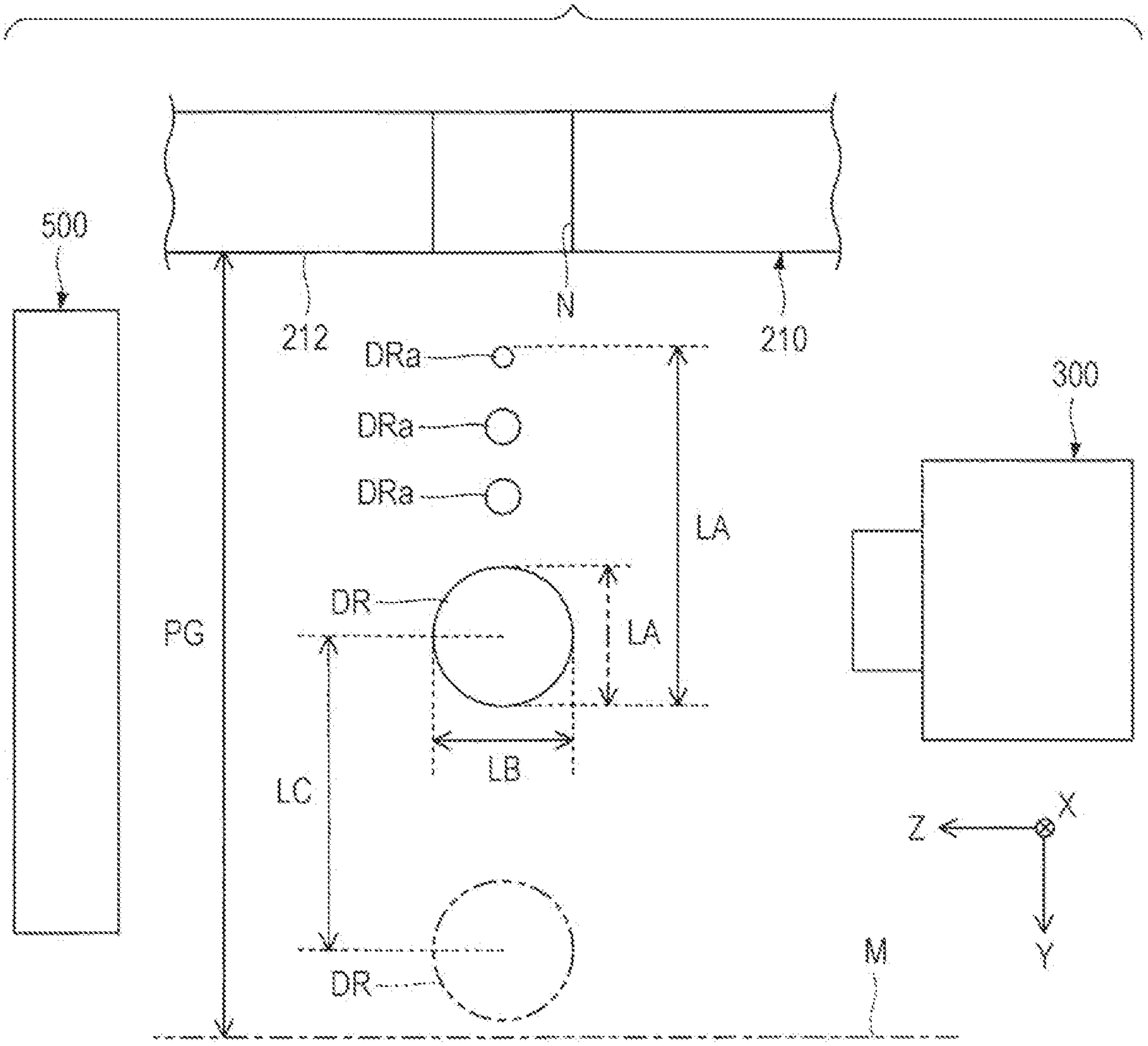
FIG. 2 illustrates measurement of discharge characteristics.

FIG. 2 illustrates measurement of ejection characteristics. As illustrated in FIG. 2, the measurement device 300 captures an image of the in-flight state of the droplet DR of ink ejected in a Y-direction from a nozzle N of the liquid ejecting head 210, in a Z-direction perpendicular to or intersecting the Y-direction. Herein, the Y-direction is an example of a first direction, and an X-direction perpendicular to or intersecting both the Y-direction and the Z-direction is an example of a second direction.

In the example illustrated in FIG. 2, a light source 500 for illuminating the droplet DR in flight is disposed at a location in the Z-direction relative to the droplet DR in flight. The light source 500 emits flashes of light at a predetermined timing in a direction toward the measurement device 300 from the droplet DR in flight, that is, in a direction opposite to the Z-direction.

The liquid ejecting head 210 is provided with a nozzle surface 212 on which the nozzle N opens. The nozzle surface 212 is typically disposed in parallel to the printing surface of the recording medium M.

The droplet DR is the main droplet ejected from the nozzle N. In the example illustrated in FIG. 2, in addition to the droplet DR, a plurality of droplets DRa called satellites, which incidentally follow the droplet DR and the formation of which is involved in the formation of the droplet DR, are ejected from the nozzle N. The droplet DRa has a smaller diameter than the droplet DR, and whether the droplets DRa are formed, the number or sizes of the droplets DRa, and so on differ depending on the type of ink, the waveform of the drive pulse PD, or the like.

The measurement device 300 captures an image of the droplet DR in flight at one timing. This timing is determined using as a reference an ejection start timing of the droplet DR from the nozzle N. The term "in flight" used herein refers to any time from the moment at which the droplet DR is ejected from the nozzle N until the moment at which the droplet DR lands on the recording medium M.

Figure 3:
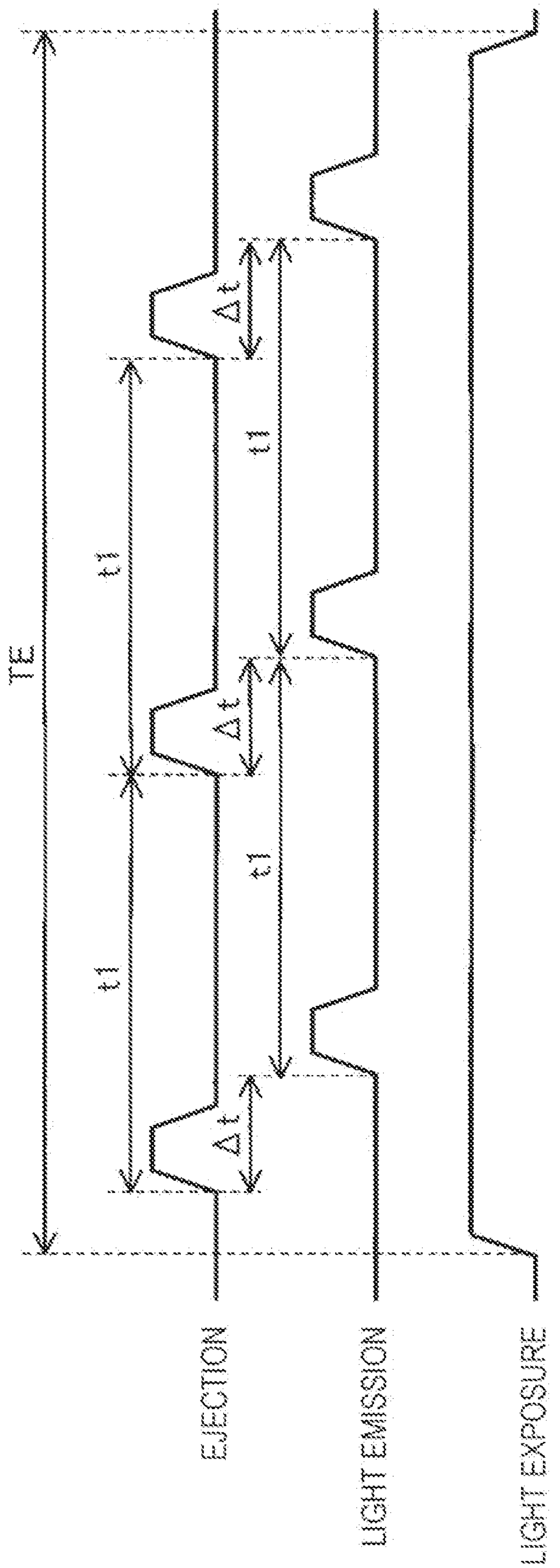
FIG. 3 is a timing chart illustrating timings of ejection of droplets, light emission of a light source, and light exposure of an imaging element during measurement of ejection characteristics.

FIG. 3 is a timing chart illustrating timings of ejection of the droplet DR, light emission of the light source 500, and light exposure of an imaging element of the measurement device 300 during measurement of ejection characteristics. In the present embodiment, as illustrated in FIG. 3, the imaging element of the measurement device 300 is exposed to light over a time period TE when the droplet DR is ejected from the nozzle N a plurality of times, during which the light source 500 emits flash light at a timing delayed from each ejection start timing of the droplet DR by a time period Δt. The light emission of the light source 500 is not limited to being performed for every ejection and may be performed, for example, for every two ejections or for every three ejections. Periodic light emission is a non-limiting example. However, it is desirable that the period of light emission of the light source 500 be an integer multiple of the period of ejection.

In the example illustrated in FIG. 3, the droplet DR is ejected from the nozzle N once every time period t1. Therefore, the light source 500 also emits light once every time period t1. Thereby, even when the amount of light emission of the light source 500 is small, a high contrast image of the droplet DR may be captured at one timing.

A captured image obtained according to a method of capturing an image by repeating light emission a plurality of times is an average image obtained over a plurality of ejections. Therefore, it is desirable that the reproducibility of the droplet DR be high when the plurality of ejections are performed. However, even if the reproducibility is poor, information on the reproducibility of the droplet DR in the plurality of ejections may be obtained by using the average image.

In addition, considering that the droplet DR in flight moves, it is desirable that the flash duration of the light source 500 be as short as possible and specifically be about 100 ns. However, the shorter the flash duration, the darker the resulting captured image. Therefore, the flash duration and the repeat count are set suitably in accordance with the size of the droplet DR, the speed, and the purpose of image capturing.

An image of the droplet DR may be captured when ejection and light emission are performed once. In addition, the measurement device 300 may capture an image of the droplet DR in flight continuously or intermittently at a very short time interval. In addition, an imaging result of the measurement device 300 may be used for measurement of ejection characteristics other than the ejection stability. For example, the timing at which the flight distance of the droplet DR from the liquid ejecting head 210 reaches a predetermined distance may be calculated in accordance with the ejection velocity of the droplet DR and the predetermined distance. In the case where the predetermined distance is a distance PG between the nozzle surface 212 and the recording medium M, the timing at which the droplet DR reaches the recording medium M is calculated in accordance with the ejection velocity of the droplet DR and the predetermined distance. The predetermined distance is known or is obtained by measurement.

The amount of the droplet DR from the liquid ejecting head 210 is calculated, for example, as the volume of the droplet DR based on the area of the droplet DR, using a captured image obtained by the measurement device 300. In addition, the ejection velocity of the droplet DR from the liquid ejecting head 210 is calculated, for example, in accordance with a distance LC between any two locations of the droplet DR in flight and a time duration during which the droplet DR in flight passes between the two locations. The distance LC and the time duration are obtained by measurement. In FIG. 2, the droplet DR located after the predetermined time period is indicated by a dash-dot-dot line. In addition, the aspect ratio (length LA/width LB) of ink from the liquid ejecting head 210 may be calculated as an ejection characteristic of ink. The ejection angle of ink from the liquid ejecting head 210 may be determined from the relation between the locations of the droplet DR before and after the predetermined time period. In addition, the amount of the droplet DR from the liquid ejecting head 210 may be calculated, as the mass of the droplet DR, in accordance with a length LA and a width LB of the droplet DR and the density of the droplet DR. In FIG. 2, although the length LA of the aspect ratio is large enough to cover the satellites, the aspect ratio may be calculated without taking into account the satellites, as indicated by the dash-dot-dot line in FIG. 2.

3. Ejection State Determination Apparatus

Figure 4:
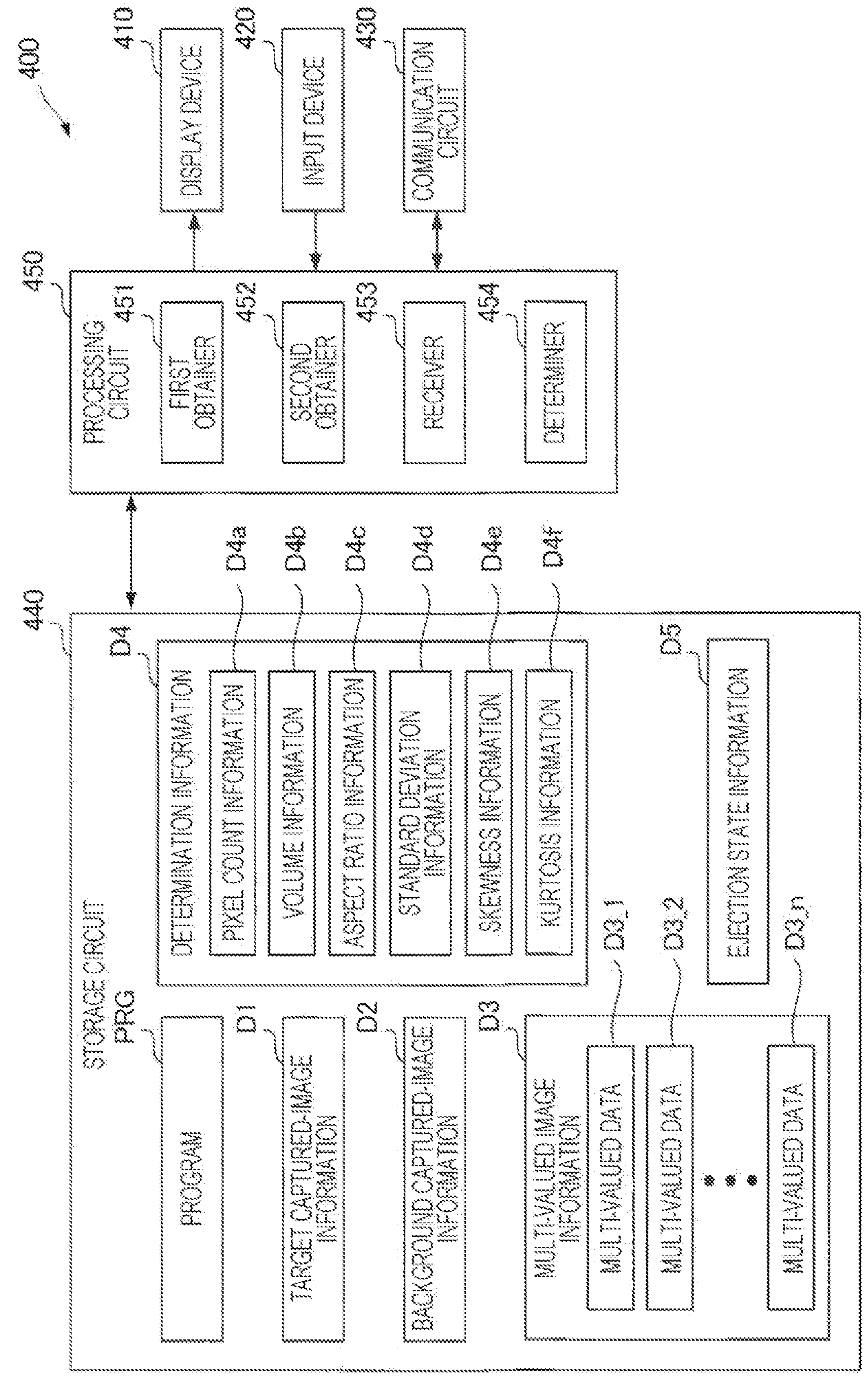
FIG. 4 is a diagram illustrating the ejection state determination apparatus according to the embodiment.

FIG. 4 is a diagram illustrating the ejection state determination apparatus 400 according to the embodiment. As illustrated in FIG. 4, the ejection state determination apparatus 400 includes a display device 410, an input device 420, a communication circuit 430, a storage circuit 440, and a processing circuit 450. These components are communicatively coupled to each other.

The display device 410 displays various images under control of the processing circuit 450. The display device 410 includes, for example, each type of display panel, such as a liquid display panel or an organic electroluminescent (EL) display panel. The display device 410 may be provided outside the ejection state determination apparatus 400. In addition, the display device 410 may be a component of the liquid ejecting device 200.

The input device 420 is a device that receives an operation from a user. For example, the input device 420 includes a pointing device such as a touch pad, a touch panel, or a mouse. The input device 420, when including a touch panel, may be used also as the display device 410. The input device 420 may be provided outside the ejection state determination apparatus 400. In addition, the input device 420 may be a component of the liquid ejecting device 200.

The communication circuit 430 is a communication device communicatively connected to each of the liquid ejecting device 200 and the measurement device 300. The communication circuit 430 includes, for example, a USB, LAN, or other interface. The communication circuit 430 may be, for example, wirelessly connected to the liquid ejecting device 200 or the measurement device 300 using Wi-Fi, Bluetooth, or the like, or may be connected to the liquid ejecting device 200 or the measurement device 300 via a LAN, the Internet, or the like.

The storage circuit 440 is a device that stores various programs, which are executed by the processing circuit 450, and various types of data, which are processed by the processing circuit 450. The storage circuit 440 includes, for example, a hard disk drive or a semiconductor memory. All or part of the storage circuit 440 may be provided in, for example, a storage device or a server outside the ejection state determination apparatus 400.

In the storage circuit 440 in the present embodiment, a program PRG, target captured-image information D1, background captured-image information D2, multi-valued image information D3, determination information D4, and ejection state information D5 are stored. In the storage circuit 440, in addition to these items of information and the program, for example, information regarding other ejection characteristics and information regarding measurement conditions, such as waveforms and temperature, used for measurement performed by the measurement device 300 may be included as appropriate.

The target captured-image information D1 is information indicating a target image obtained by capturing, using the measurement device 300, an image of the droplet DR ejected from the nozzle N at one timing while the droplet DR is in flight, as described above. The number of pixels of the image represented by the target captured-image information D1 is not limited. However, it is desirable that this number of pixels match the number of pixels of an image represented by the background captured-image information D2 described later or the multi-valued image information D3 described later, from the viewpoint of simplifying a process of obtaining the multi-valued image information D3 by using a difference between the target captured-image information D1 and the background captured-image information D2. In addition, the target captured-image information D1 includes a plurality of pieces of multi-valued data representing the luminance as a predetermined number of gradations for each pixel. The number of gradations is not limited; however, it is desirable that this number match the number of gradations of multi-valued data of the background captured-image information D2 or the multi-valued image information D3, from the viewpoint of simplifying the process of obtaining the multi-valued image information D3 by using a difference between the target captured-image information D1 and the background captured-image information D2. The target captured-image information D1 is obtained by a first obtainer 451.

The background captured-image information D2 is information representing a background image obtained by capturing, using the measurement device 300, an image of the same area as that of the target image represented by the target captured-image information D1 while inhibiting the droplet DR from being ejected from the nozzle N. It is desirable that the image-capturing conditions (such as imaging means and light source settings) for a background image for obtaining the background captured-image information D2 be the same as the image-capturing conditions for a target image for obtaining the target captured-image information D1. The number of pixels of the image represented by the background captured-image information D2 is not limited; however, it is desirable that this number match the number of pixels of an image represented by the target captured-image information D1 or the multi-valued image information D3, from the viewpoint of simplifying the process of obtaining the multi-valued image information D3 by using a difference between the target captured-image information D1 and the background captured-image information D2. In addition, the background captured-image information D2 includes a plurality of pieces of multi-valued data representing the luminance of each pixel as a predetermined number of gradations. The number of gradations is not limited; however, it is desirable that this number match the number of gradations of multi-valued data of the target captured-image information D1 or the multi-valued image information D3, from the viewpoint of simplifying the process of obtaining the multi-valued image information D3 by using a difference between the target captured-image information D1 and the background captured-image information D2. The background captured-image information D2 is obtained by the first obtainer 451.

The multi-valued image information D3 is information representing a difference image obtained by subtracting a background image represented by the background captured-image information D2 from a target image represented by the target captured-image information D1, and includes a plurality of pieces of multi-valued data D3_1 to D3_*n*, where n is the number of pixels of an image represented by the multi-valued image information D3. The plurality of pieces of multi-valued data D3_1 to D3_*n* correspond to n pixels, and each represents the luminance of the corresponding pixel as the number of gradations, such as 8-bit gradations, which is a multi-value. That is, the multi-valued data D3_*k* represents the luminance of the kth pixel as being multi-valued, where k is a natural number greater than or equal to one and less than or equal to n. For example, when n pixels are arranged in P rows and Q columns, a pixel in the first row and first column is the first pixel, a pixel in the first row and Qth column is the Qth pixel, a pixel in the second row and first column is the (Q+1)th pixel, . . . , a pixel in the Pth row and Qth column is the (P×Q)th pixel. Each of P and Q is a natural number and P×Q is n. For example, in an image G3 illustrated in FIG. 6 described later, the multi-valued data D3_1 is data corresponding to the pixel in the first row and first column and therefore has a value of zero. In addition, the multi-valued data D3_15 is data of the pixel in the second row and fifth column and therefore has a value of five. In addition, the multi-valued data D3_26 is data of the pixel in the third row and sixth column and therefore has a value of 20. The multi-valued image information D3 mentioned above is obtained by the first obtainer 451.

The determination information D4 is information based on the plurality of pieces of multi-valued data D3_1 to D3_*n* and indicates elements regarding the stability of the droplet DR. The determination information D4 is obtained by the second obtainer 452. In the example illustrated in FIG. 4, the determination information D4 includes pixel count information D4*a*, volume information D4*b*, aspect ratio information D4*c*, standard deviation information D4*d*, skewness information D4*e*, and kurtosis information D4*f*.

The pixel count information D4*a* is information on the number of pixels PX in which the respective pieces of multi-valued data D3_1 to D3_*n* each have a value greater than or equal to a predetermined value, among the plurality of pixels PX. The volume information D4*b* is information on the virtual volume of the droplet DR. The aspect ratio information D4*c* is information on the aspect ratio of the droplet DR. Each of the standard deviation information D4*d*, the skewness information D4*e*, and the kurtosis information D4*f* is information on the distribution of the plurality of pieces of multi-valued data D3_1 to D3_*n*. Specifically, the standard deviation information D4*d* is information on the standard deviation of the plurality of pieces of multi-valued data D3_1 to D3_*n*. The skewness information D4*e* is information on the skewness of the plurality of pieces of multi-valued data D3_1 to D3_*n*. The kurtosis information D4*f* is information on the kurtosis of the plurality of pieces of multi-valued data D3_1 to D3_*n*.

The ejection state information D5 is information indicating a result of determining the ejection state based on whether a value indicated by the determination information D4 satisfies a predetermined condition. The ejection state information D5 is generated by the determiner 454. For example, the ejection state information D5 includes information indicating whether the ejection state is normal, or includes information indicating whether each element indicated by the determination information D4 described above is within the normal range.

The program PRG is an exemplary ejection state determination program for determining the ejection state of the liquid ejecting head 210 in which a plurality of nozzles N for ejecting ink in the Y-direction are arranged in the X-direction.

The processing circuit 450 is a device having a function of controlling the components of the ejection state determination apparatus 400, the liquid ejecting device 200, and the measurement device 300 and a function of processing various types of data. The processing circuit 450 includes, for example, a processor, such as a CPU. The processing circuit 450 may include a single processor or may include a plurality of processors. In addition, some or all of the functions of the processing circuit 450 may be implemented by hardware such as a digital signal processor (DSP), an application specific integrated circuit (ASIC), a programmable logic device (PLD), or an FPGA.

The processing circuit 450 reads the program PRG from the storage circuit 440 and executes the program PRG, thereby functioning as the first obtainer 451, the second obtainer 452, a receiver 453, and the determiner 454.

The first obtainer 451 obtains the plurality of pieces of multi-valued data D3_1 to D3_*n* of the image G3 composed of the plurality of pixels PX by capturing, at one timing, an image of the droplet DR ejected from one nozzle N selected from the plurality of nozzles N. In the present embodiment, the first obtainer 451 obtains the multi-valued image information D3 including the plurality of pieces of multi-valued data D3_1 to D3_*n*. Specifically, the first obtainer 451 generates the multi-valued image information D3 by generating the target captured-image information D1 and the background captured-image information D2 using the measurement device 300 and then calculating, for each pixel, a difference in luminance between a target image represented by the target captured-image information D1 and a background image represented by the background captured-image information D2. The processing of the first obtainer 451 will be described in detail later with reference to FIG. 6.

The second obtainer 452 obtains the determination information D4 from the plurality of pieces of multi-valued data D3_1 to D3_*n*. In the present embodiment, the second obtainer 452 obtains the pixel count information D4*a*, the volume information D4*b*, the aspect ratio information D4*c*, the standard deviation information D4*d*, the skewness information D4*e*, and kurtosis information D4*f*. The processing of the second obtainer 452 will be described in detail later with reference to FIG. 7.

The receiver 453 notifies the user of the determination information D4 and receives an input result of the user in response to the notification. For example, the receiver 453 causes the display device 410 to display an image for a graphical user interface (GUI) based on the determination information D4. The processing of the receiver 453 will be described in detail later with reference to FIG. 8 and FIG. 9.

The determiner 454 determines whether the value indicated by the determination information D4 satisfies a predetermined condition, and determines the ejection state based on a result of the determination. The processing of the determiner 454 will be described in detail later with reference to FIG. 5.

4. Ejection State Determination Method

Figure 5:
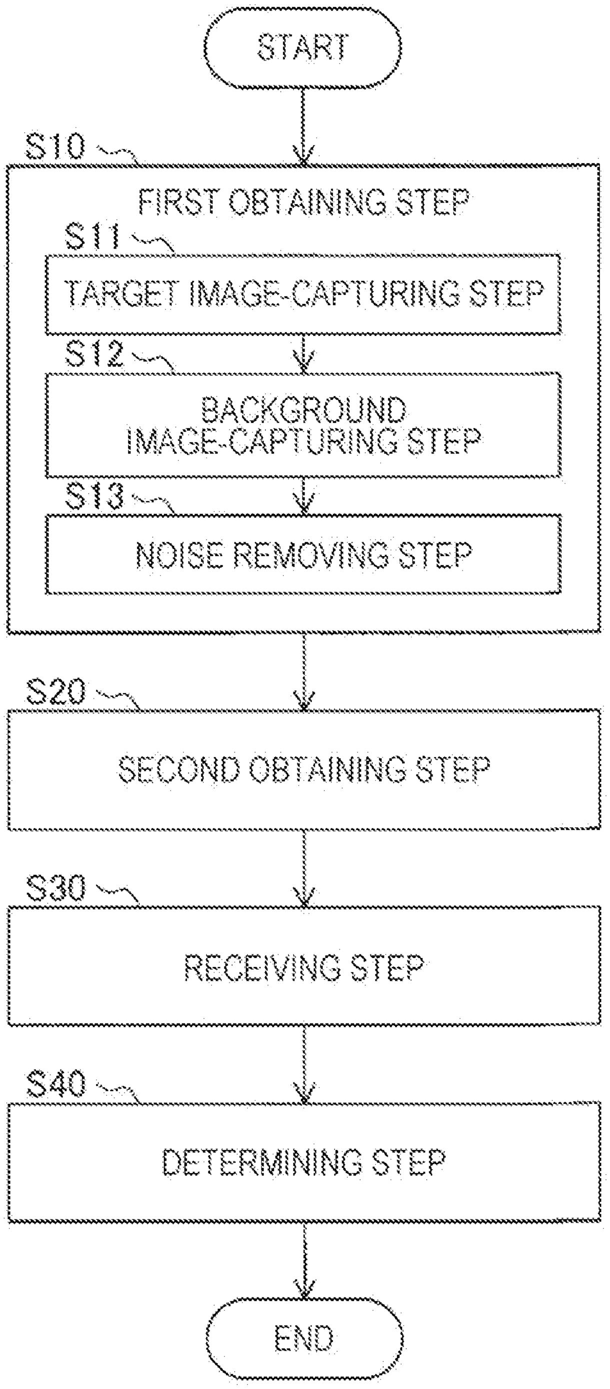
FIG. 5 is a flowchart illustrating an ejection state determination method according to the embodiment.

FIG. 5 is a flowchart illustrating an ejection state determination method according to the embodiment. The ejection state determination method is performed using the ejection state determination apparatus 400 described above. As illustrated in FIG. 5, the ejection state determination method includes a first obtaining step S10, a second obtaining step S20, a receiving step S30, and a determining step S40 in this order.

The first obtaining step S10 obtains the plurality of pieces of multi-valued data D3_1 to D3_*n* of the image G3 composed of the plurality of pixels PX by capturing, at one timing, an image of the droplet DR ejected from one nozzle N selected from the plurality of nozzles N. The obtaining is performed by the first obtainer 451. In the example illustrated in FIG. 5, the first obtaining step S10 includes a target image-capturing step S11, a background image-capturing step S12, and a noise removing step S13 in this order.

In the target image-capturing step S11, the first obtainer 451 generates the target captured-image information D1 using the measurement device 300. In the background image-capturing step S12, the first obtainer 451 generates the background captured-image information D2 using the measurement device 300. In the noise removing step S13, the first obtainer 451 generates the multi-valued image information D3 based on the target captured-image information D1 and the background captured-image information D2. The first obtaining step S10 will be described in detail later with reference to FIG. 6.

The execution timing of the background image-capturing step S12 may be any timing as long as the execution timing is prior to the noise removing step S13, and is not limited to the example illustrated in FIG. 5 and may be prior to the target image-capturing step S11. In addition, the target image-capturing step S11 may be performed repeatedly a plurality of times, in which case the background image-capturing step S12 may be performed at least once. However, when the target image-capturing step S11 is performed repeatedly a plurality of times, the noise removal effects through the noise removing step S13 are suitably obtained by performing the background image-capturing step S12 every time. The background image-capturing step S12 and the noise removing step S13 may be omitted.

In the second obtaining step S20, the determination information D4 is obtained from the plurality of pieces of multi-valued data D3_1 to D3_*n*. The obtaining is performed by the second obtainer 452.

In the receiving step S30, the user is notified of the determination information D4, and an input result of the user in response to the notification is received. The receiving is performed by the receiver 453.

In the determining step S40, it is determined whether the value indicated by the determination information D4 satisfies a predetermined condition, and an ejection state is determined based on a result of the determination.

4-1. First Obtaining Step

Figure 6:
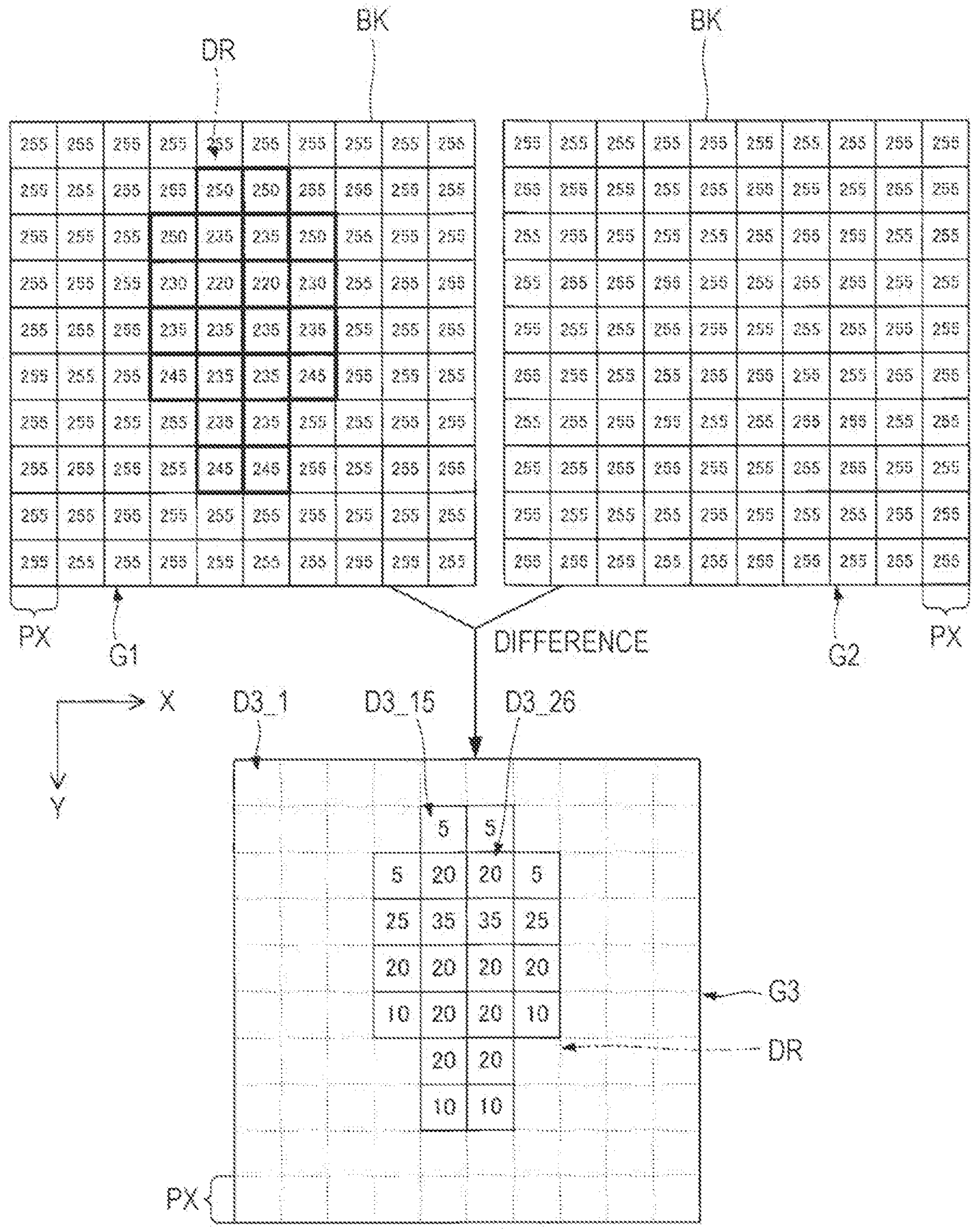
FIG. 6 is a diagram illustrating a first obtaining step.

FIG. 6 is a diagram illustrating the first obtaining step S10. FIG. 6 illustrates a target image G1 represented by the target captured-image information D1, a background image G2 represented by the background captured-image information D2, and an image G3 represented by the multi-valued image information D3. In the example illustrated in FIG. 6, for convenience of description, each of the target image G1, the background image G2, and the image G3 is composed of 100 pixels PX in 10 rows and 10 columns. In addition, in the example illustrated in FIG. 6, the luminance of the pixel PX is represented as being multi-valued using 256 gradations from 0 to 255. The number of pixels PX constituting each of the target image G1, the background image G2, and the image G3 is not limited to the example illustrated in FIG. 6 as long as it is sufficient to enable desired determination information D4 to be obtained. In addition, the number of gradations of the pixel PX is not limited to 256 (8 bit) but may be, for example, 16 (4 bit).

Hereafter, a multi-valued image corresponding to one droplet DR will be described unless mentioned otherwise. One droplet DR is basically droplets that are ejected at the same timing from one nozzle N and are ejected continuously. In the image G3 described later, when a droplet is present in at least two pixels, one pixel and another pixel adjacent in any direction to the one pixel, (in which the value of multi-valued data is greater than zero), the at least two pixels are assumed as target pixels, in which case a set of target pixels at locations adjacent to each other may be assumed as a group of pixels corresponding to one droplet DR. However, droplets that are continuously ejected may be assumed as one droplet DR even if the droplets are ejected from different nozzles or at different timings.

As described above, a description will be given of the case of processing multi-valued data corresponding to one droplet DR unless mentioned otherwise. However, respective pieces of multi-valued data corresponding to different droplets may be processed at the same timing, respective pieces of multi-valued data corresponding to different droplets may be processed at different timings, and multi-valued data corresponding to the same droplet may be processed repeatedly at different timings. At this point, multi-valued data corresponding to one droplet DR to be processed is to be distinguished from the multi-valued data corresponding to other droplets. To accomplish this, any method may be used.

As illustrated on the left side at the top of FIG. 6, a plurality of droplets DR ejected from a plurality of nozzles N appear together with a background BK in the target image G1 represented by the target captured-image information D1. In the example illustrated in FIG. 6, the target image G1 captured when a light source (not illustrated) is present in the background BK is illustrated, and the value of multi-valued data of each of the pixels PX corresponding to the background BK is 255. When the droplet DR is present, the value of multi-valued data of each of the pixels PX corresponding to the droplet DR is smaller than the value of multi-valued data of each of the pixels PX corresponding to the background BK by a value equivalent to a portion where light is blocked by the droplet DR.

In contrast, as illustrated on the right side at the top of FIG. 6, only the background BK appears in the background image G2 represented by the background captured-image information D2. In the example illustrated in FIG. 6, the background image G2 captured when a light source (not illustrated) is present in the background BK is illustrated, and the value of multi-valued data of every pixel PX of the background image G2 is 255.

In the noise removing step S13 mentioned above, by using a difference between the target image G1 and the background image G2, as illustrated at the bottom of FIG. 6, the image G3 represented by the multi-valued image information D3 is obtained as a difference image. In the image G3, with the background BK mentioned above removed, a plurality of droplets DR based on the target image G1 appear. In the example illustrated in FIG. 6, the image G3 obtained by subtracting, for each corresponding pixel PX, the value of multi-valued data of the target image G1 from the value of multi-valued data of the background image G2 is illustrated. The image G3 may be obtained by subtracting, for each corresponding pixel PX, the value of multi-valued data of the background image G2 from the value of multi-valued data of the target image G1, or may use the target image G1 without any change.

Through the noise removing step S13 in such a manner, even when the contrast between the droplet DR and the background BK is poor due to insufficient illumination or when a dirt is adhered to the lens of a camera of the measurement device 300, noise in the target image G1 may be removed and thus the accuracy of detection of the droplet DR may be enhanced.

As described above, the first obtaining step S10 includes capturing an image of the droplet DR ejected from one nozzle N selected from the plurality of nozzles N against the background BK of the light source 500, and removing noise of the plurality of pieces of multi-valued data D3_1 to D3_*n* using the background image G2 of the image capturing.

Here, each of the target image G1 and the background image G2 is composed of n pixels PX, and each of the target captured-image information D1 and the background captured-image information D2 is constituted by multi-valued data that represents the luminance of each pixel PX as being multi-valued. Therefore, the image G3 is composed of n pixels PX, and the multi-valued image information D3 is constituted by the plurality of pieces of multi-valued data D3_1 to D3_*n* each of which represents the luminance of the respective pixel PX as being multi-valued. In the example illustrated in FIG. 6, n is 100.

In the example illustrated in FIG. 6, as described above, the case where the multi-valued data of the image G3 is obtained by subtracting the multi-valued data of the target image G1 from the multi-valued data of the background image G2 is illustrated. In FIG. 6, the value represented by multi-valued data is illustrated in each of the pixels PX corresponding to an area where the droplet DR is present. In the example illustrated in FIG. 6, the case where the value represented by multi-valued data may be a value from 0 to 255. In FIG. 6, for convenience of visibility, the value "0" represented by multi-valued data is not illustrated. In addition, the range of values represented by multi-valued data may be any range and is not limited to the example illustrated in FIG. 6 as long as the characteristics of the droplet DR is able to be determined.

4-2. Second Obtaining Step

In the second obtaining step S20, the determination information D4 is obtained by quantifying indices regarding characteristics of the droplet DR by using the plurality of pieces of multi-valued data D3_1 to D3_*n*. In this quantification, in the image G3, the coordinates and multi-valued data of the pixels PX in which the droplet DR is present are used.

The target captured-image information D1 used in the first obtaining step S10 described above may be information obtained by image capturing with one light emission or may be information obtained by image capturing with a plurality of light emissions. The target captured-image information D1 obtained by image capturing with a plurality of light emissions includes information on the repetitive reproducibility of the ejection state and may be used as an index for quantifying the reproducibility. If the reproducibility is high to a certain extent, for example, indices such as the aspect ratio, the number of pixels, and volume of the droplet DR may be quantified even when the target captured-image information D1 obtained by image capturing with a plurality of light emissions is used, similarly to when the target captured-image information D1 obtained by image capturing with a single light emission is used.

Each of the plurality of indices regarding the characteristics of the droplet DR may be individually associated with a specific flight state, the plurality of indices may be combined together and be associated with a specific flight state, or the plurality of indices may be associated with a specific flight state using machine learning, such as deep learning and clustering, and data mining. In addition, each index regarding the characteristics of the droplet DR is not limited to the index regarding the state of an individual droplet DR and may be an index in which the locations of a plurality of droplets DR or variations among the locations are combined. By combining a plurality of indices, various flight states may be classified or quantified.

FIG. 7 is a table illustrating exemplary determination information D4 obtained in the second obtaining step S20. As illustrated in FIG. 7, the determination information D4 is information indicating the number of pixels indicated by the pixel count information D4*a*, the volume indicated by the volume information D4*b*, the aspect ratio indicated by the aspect ratio information D4*c*, the standard deviation indicated by the standard deviation information D4*d*, the skewness indicated by the skewness information D4*e*, and the kurtosis indicated by the kurtosis information D4*f*.

In the example illustrated in FIG. 7, a result of calculating respective numerical values of the number of pixels, volume, aspect ratio, mean pixel value, standard deviation, skewness, and kurtosis based on the multi-valued data illustrated at the bottom of FIG. 6 described above. Each numerical value will be described below.

The number of pixels indicated by the pixel count information D4*a* is obtained by counting the number of pixels PX occupied by the droplet DR in the image G3. The number of pixels indicates the size of the droplet DR in the image G3. When an average image is used as the target image G1 described above, the poorer the reproducibility of ejection, the more the number of pixels. In addition, for example, the deviation of the droplet DR may be detected by determining the number of pixels in combination with the volume or mass of the droplet DR.

The volume indicated by the volume information D4*b* is calculated using the coordinates of the image G3 and the value represented by the multi-valued data. For example, a volume V may be calculated by approximating a solid of revolution around the center line parallel to the Y-axis of an image of the droplet DR, as follows.

$$V=\Sigma\pi\times r(i)\times w(p(i))$$

In the above equation, r(i) is an actual distance based on the number of pixels from the center line of an ith pixel, p(i) is a value represented by multi-valued data of the ith pixel, and w(p(i)) is a function of the value that takes a value of [0, 1]. Here, w(p(i)) is a weight function, and takes a value smaller than one when the repetitive reproducibility of an ejection state is low or when the value represented by multi-valued data at the boundary of the droplet DR is close to the value in an area where the droplet DR is absent.

For the weight function w(p(i)), calibration may be performed by comparing a value of the volume estimated from the image G3 with a value that is obtained by measuring the mass of the droplet DR with, for example, an electronic force balance and performing a calculation using the density of a liquid. The calibration is desirably performed each time when image-capturing conditions change, such as when the settings of a camera or a strobe light are changed in an observation system for the droplet DR. Volume estimation may be performed more accurately by performing calibration in such a manner. Calibration may be performed manually or may be performed automatically using, for example, an optimization algorithm.

In addition, the method of calculating a volume indicated by the volume information D4*b* is not limited to the example mentioned above. For example, to find not a volume in the real space but a relative volume based on the size of the pixel PX, it is assumed that the droplet DR in the image G3 has a shape of a perfect circle as seen in a direction along the Y-axis. Under this assumption, for the range of the pixels PX corresponding to the droplet DR in the image G3, a value is calculated by multiplying the square of a radius in the X-direction at each Y-coordinate by the number π, the ratio of the circumference of a circle to its diameter, and then all the calculated values are summed. Thereby, the volume indicated by the volume information D4*b* may be obtained. The volume indicated in FIG. 7 is a volume calculated by this calculation method.

The aspect ratio indicated by the aspect ratio information D4*c* is calculated as a ratio LA/LB of the pixels PX occupied by the droplet DR in the image G3, where LB is a width based on the number of pixels in the X-direction and LA is a length based on the number of pixels in the Y-direction.

When the target captured-image information D1 obtained by image capturing with a plurality of light emissions is used, the satellites may overlap each other such that an image illustrating a droplet with a long tail is obtained. In this case, the aspect ratio is high, and therefore the aspect ratio may be used indirectly as an index of the number of satellites or the location distribution of the droplet DR.

The mean pixel value is an average value of the values of multi-valued data of the pixels PX occupied by the droplet DR in the image G3. As described above, when an image of the droplet DR is captured against a background of the light source 500, in the target image G1, the value of the multi-valued data of the pixel PX in which the droplet DR is present is lower than that in the background BK. In the present embodiment, since, as described above, the image G3 is obtained by subtracting multi-valued data of the target image G1 from the multi-valued data of the background image G2, in the image G3, which is a difference image, the value of multi-valued data of each of the pixels PX in which the droplet DR is present is a positive value. In addition, when the target captured-image information D1 obtained by image capturing with a plurality of light emissions is used, the higher the reproducibility of an ejection state, the lower the mean pixel value of the pixels PX occupied by the droplet DR tends to be.

The standard deviation indicated by the standard deviation information D4*d* is a standard deviation of values of multi-valued data of the pixels PX occupied by the droplet DR in the image G3.

The kurtosis indicated by the kurtosis information D4*f* is an index indicating the peakedness of a distribution of values of multi-valued data of the pixels PX occupied by the droplet DR in the image G3. The larger the kurtosis, the more acute peak and the longer and thicker tail the distribution has, whereas the smaller the kurtosis, the more rounded peak and the shorter and thinner tail the distribution has. Regarding the kurtosis, the kurtosis of a normal distribution may be defined as being equal to zero or equal to three. In the present disclosure, either definition may be employed.

The skewness indicated by the skewness information D4*e* is an index indicating the asymmetry of a distribution of values of multi-valued data of the pixels PX occupied by the droplet DR in the image G3. The skewness takes a negative value when the left tail of the distribution is long, and takes a positive value when the right tail of the distribution is long.

4-3. Receiving Step

Figure 8:
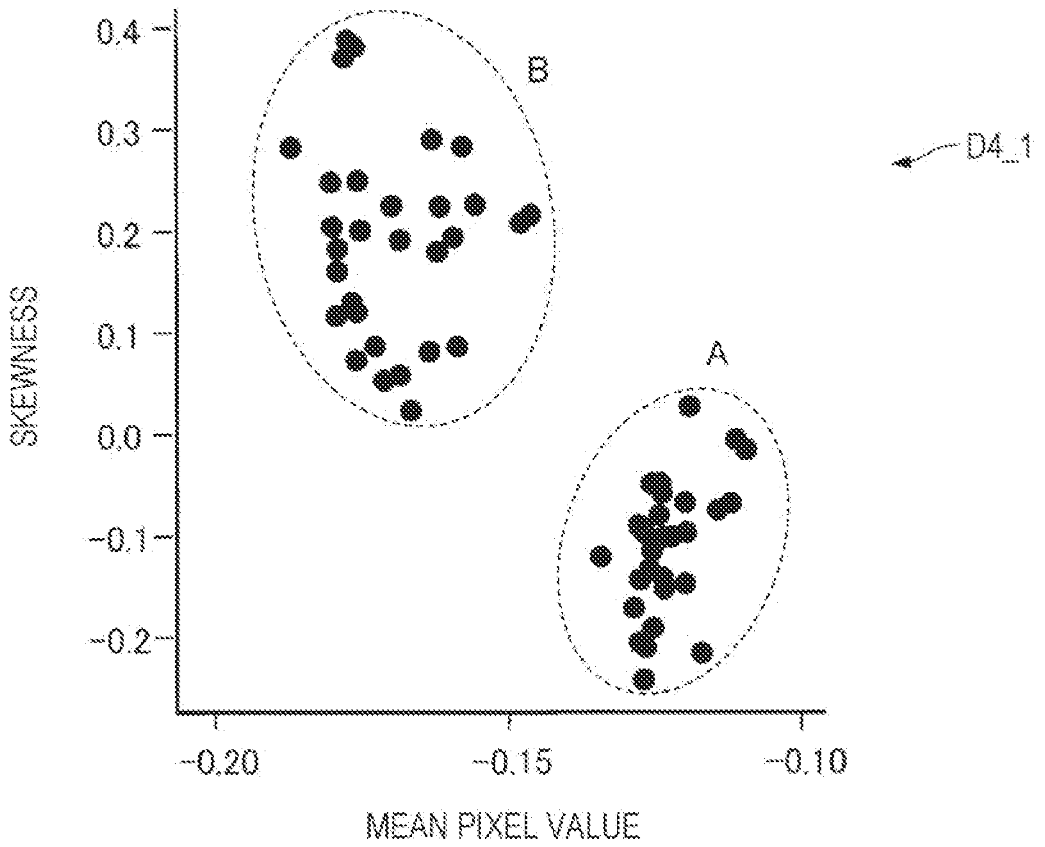
FIG. 8 is a graphical representation illustrating an example of first determination information notification of which is provided in a receiving step.
Figure 9:
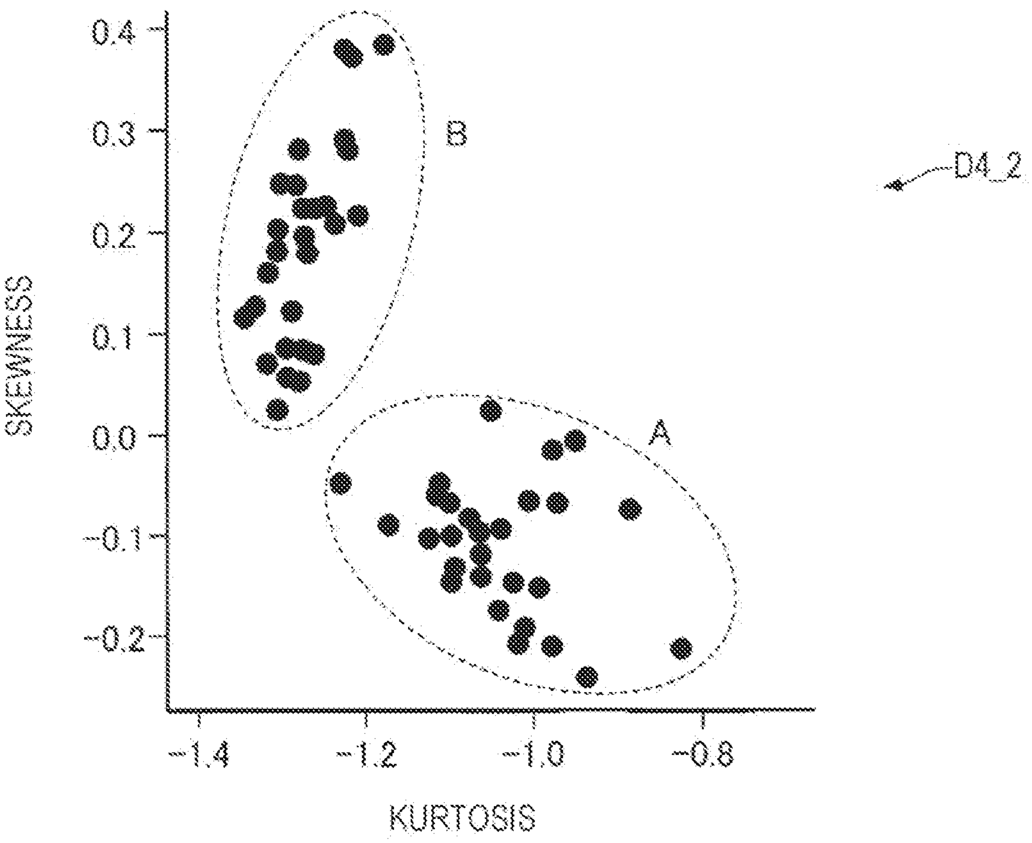
FIG. 9 is a diagram illustrating an example of second determination information notification of which is provided in the receiving step.

FIG. 8 is a graphical representation illustrating an example of first determination information D4_1 notification of which is provided in the receiving step S30. FIG. 9 is a graphical representation illustrating an example of second determination information D4_2 notification of which is provided in the receiving step S30.

In the receiving step S30, switching is available between a state where a user is notified of the first determination information D4_1 and a state where the user is notified of the second determination information D4_2.

The notifications are displayed on the display device 410.

The first determination information D4_1 is one or more pieces of information among the information mentioned above included in the determination information D4, and the second determination information D4_2 is one or more pieces of information different from the first determination information D4_1 among the information mentioned above included in the determination information D4.

In such a manner, the determination information D4 includes the first determination information D4_1 and the second determination information D4_2.

In the example illustrated in FIG. 8, the first determination information D4_1 indicates the mean pixel value and the skewness. Specifically, the first determination information D4_1 is represented as a graph with the mean pixel value on the horizontal axis and the skewness on the vertical axis. In the example illustrated in FIG. 9, the second determination information D4_2 indicates the kurtosis and the skewness. Specifically, the second determination information D4_2 is represented as a graph with the kurtosis on the horizontal axis and the skewness on the vertical axis. In each of FIG. 8 and FIG. 9, a plurality of dots classified into a set A and a set B are illustrated in the graph. A plurality of data points are obtained because of differences in a plurality of nozzles, ejection performed a plurality of times, a plurality of ejection conditions, the main droplet, and satellites. The respective pieces of determination information for droplets that are ejected under the same conditions and that have the same history of division, coalescence, or the like have values close to each other. Here, the set A is a set of pieces of multi-valued data corresponding to the main droplets DR and the set B is a set of pieces of multi-valued data corresponding to the satellite droplets. Although not illustrated here, the set A may be a set of the main droplets ejected with a first waveform, and the set B may be a set of the main droplets ejected with a second waveform. The plurality of data points may be obtained at the same timing or at different timings.

Each of the first determination information D4_1 and the second determination information D4_2 is not limited to the example illustrated in FIG. 8 or FIG. 9, and may be indicated by, for example, a graph in which the vertical axis and the horizontal axis are two indices selected from the indices such as the number of pixels, aspect ratio, mean pixel value, kurtosis, and skewness.

4-4. Determining Step

In the determining step S40, it is determined whether the number of pixels, volume, aspect ratio, kurtosis, and skewness indicated by the determination information D4 satisfy the respective predetermined conditions, and an ejection state is determined based on a result of the determination.

Specifically, in the determining step S40, it is determined whether the number of pixels PX in which the respective pieces of multi-valued data D3_1 to D3_*n* each have a value greater than or equal to a predetermined value (the pixels PX occupied by the droplet DR), among the plurality of pixels PX, is within a predetermined range. If the number is within the predetermined range, it is determined that the ejection state is normal; however, if the number is not within the predetermined range, it is determined that the ejection state is abnormal. Here, if, among the plurality of pixels PX, the number of pixels PX in which the respective pieces of multi-valued data D3_1 to D3_*n* each have a value greater than or equal to a predetermined value is excessively large, it is determined that the ejection state is not stable because the droplet DR spreads over the entire area. In contrast, if this number is excessively small, it is determined that the ejection state is abnormal.

In addition, in the determining step S40, it is determined whether the volume indicated by the volume information D4*b* is within a predetermined range. If the volume is within the predetermined range, it is determined that the ejection state is normal; however, if the volume is not within the predetermined range, it is determined that the ejection state is abnormal. Here, if the volume is excessively large, it is determined that the ejection state is not stable because the droplet DR spreads over the entire area. In contrast, if the volume is excessively small, it is determined that the ejection state is abnormal.

Furthermore, in the determining step S40, it is determined whether the aspect ratio indicated by the aspect ratio information D4*c* is within a predetermined range. If the aspect ratio is within the predetermined range, it is determined that the ejection state is normal; however, if the aspect ratio is not within the predetermined range, it is determined that the ejection state is abnormal. Here, if the aspect ratio is excessively large, it is determined that the droplet DR is vertically long and is unstable. In contrast, if the aspect ratio is excessively small, it is determined that the droplet DR is horizontally long and is unstable.

In addition, in the determining step S40, it is determined whether the standard deviation indicated by the standard deviation information D4*d* is smaller than a threshold value. If the standard deviation is smaller than the threshold value, it is determined that the ejection state is normal; however, if the standard deviation is greater than or equal to the threshold value, it is determined that the ejection state is abnormal.

Furthermore, in the determining step S40, it is determined whether the kurtosis indicated by the kurtosis information D4*f* is greater than or equal to a threshold value. If the kurtosis is greater than the threshold value, it is determined that the ejection state is normal; however, if the kurtosis is less than or equal to the threshold value, it is determined that the ejection state is abnormal.

In addition, in the determining step S40, the skewness information D4*e* is compared with a threshold value. The skewness is zero when the distribution is symmetrical as in a normal distribution. That is, as the skewness is closer to zero, the ejection state may be determined to be more stable. Depending on what data is used as multi-valued data, for example, whether data the value of which is small only in an area where the droplet is present, such as the data of G1, or data the value of which is greater than zero only in an area where the droplet is present, such as the data of G3 obtained by subtracting the data of G1 from the data of G2, is used, the skewness is either positive or negative. However, in either case, use of the absolute value of the skewness enables the ejection state to be evaluated by using the skewness. For example, it is determined whether the absolute value of the skewness indicated by the skewness information D4*e* is smaller than or equal to a threshold value. If the absolute value of the skewness is smaller than the threshold value, it is determined that the ejection state is normal; however, if the absolute value of the skewness is greater than the threshold value, it is determined that the ejection state is abnormal. The skewness is a skewness indicated by the skewness information D4*e*.

The ejection state determination method described above determines the ejection state of the liquid ejecting head 210 in which a plurality of nozzles N for ejecting ink in the Y-direction are arranged in the X-direction. As used here, the Y-direction is an example of the first direction, the X-direction is an example of the second direction intersecting the first direction, and ink is an example of the liquid.

The ejection state determination method includes the first obtaining step S10 and the second obtaining step S20 as described above. The first obtaining step S10 obtains the plurality of pieces of multi-valued data D3_1 to D3_*n* of the image G3 composed of the plurality of pixels PX by capturing, at one timing, an image of the droplet DR ejected from one nozzle N selected from the plurality of nozzles N. In the second obtaining step S20, the determination information D4 is obtained from the plurality of pieces of multi-valued data D3_1 to D3_*n*.

In the ejection state determination method as described above, since, in the first obtaining step S10, the plurality of pieces of multi-valued data D3_1 to D3_*n* of the image G3 composed of the plurality of pixels PX are obtained by capturing, at one timing, an image of the droplet DR ejected from one nozzle N, the plurality of pieces of multi-valued data D3_1 to D3_*n* indicate a plurality of elements regarding the stability of the flight state of the droplet DR. Then, in the second obtaining step S20, since the determination information D4 is obtained from the plurality of pieces of multi-valued data D3_1 to D3_*n*, the determination information D4 indicating a plurality of elements regarding the stability of the flight state of the droplet DR may be obtained. Therefore, by using the determination information D4, the ejection state may be evaluated for the plurality of elements regarding the stability of the flight state of the droplet DR.

In the present embodiment, as described above, the determination information D4 includes the pixel count information D4*a*. The pixel count information D4*a* is information on the number of pixels PX in which the respective pieces of multi-valued data D3_1 to D3_*n* each have a value greater than or equal to a predetermined value, among the plurality of pixels PX. Therefore, by using the determination information D4, the size of the droplet DR may be evaluated.

In addition, as described above, the determination information D4 includes the volume information D4*b*. The volume information D4*b* is information on the virtual volume of the droplet DR. Therefore, by using the determination information D4, the volume of the droplet DR may be evaluated.

Furthermore, as described above, the determination information D4 includes the aspect ratio information D4*c*. The aspect ratio information D4*c* is information on the aspect ratio of the droplet DR. Therefore, by using the determination information D4, the aspect ratio of the droplet DR may be evaluated. For example, when the aspect ratio of a liquid is within a predetermined range, the flight state of the droplet DR is evaluated to be good.

In addition, as described above, the determination information D4 includes information on the distribution of one or more pieces of multi-valued data D3_1 to D3_*n* of an area where a droplet is present, among the plurality of multi-valued data D3_1 to D3_*n*. Therefore, the distribution may be evaluated by using the determination information D4. For example, elements regarding the stability of the droplet DR may be provided to the user by visualizing the distribution.

Specifically, as described above, the determination information D4 includes the standard deviation information D4*d*. The standard deviation information D4*d* is information on the standard deviation of one or more pieces of multi-valued data D3_1 to D3_*n* of an area where a droplet is present, among the plurality of multi-valued data D3_1 to D3_*n*. Therefore, the standard deviation may be evaluated by using the determination information D4. For example, when the standard deviation has a value lower than a predetermined value, the flight state of the droplet DR is evaluated to be good. In addition, by combining the standard deviation with the value of the mean pixel value, skewness, kurtosis, or the like of the plurality of multi-valued data D3_1 to D3_*n*, the flight states of the droplet DR may be classified.

In addition, as described above, the determination information D4 includes the skewness information D4*e*. The skewness information D4*e* is information on the skewness of one or more pieces of multi-valued data D3_1 to D3_*n* of an area where a droplet is present, among the plurality of multi-valued data D3_1 to D3_*n*. Therefore, the skewness may be evaluated by using the determination information D4. For example, when the skewness has a positive value, the flight state of the droplet DR is evaluated to be good. In addition, by combining the skewness with the value of, for example, the kurtosis of one or more pieces of multi-valued data D3_1 to D3_*n* of an area where a droplet is present, among the plurality of multi-valued data D3_1 to D3_*n*, the flight states of the droplet DR may be classified.

Furthermore, as described above, the determination information D4 includes the kurtosis information D4*f*. The kurtosis information D4*f* is information on the kurtosis of one or more pieces of multi-valued data D3_1 to D3_*n* of an area where a droplet is present, among the plurality of multi-valued data D3_1 to D3_*n*. Therefore, the kurtosis may be evaluated by using the determination information D4. For example, when the kurtosis has a value higher than a predetermined value, the flight state of the droplet DR is evaluated to be good. In addition, by combining the kurtosis with the mean pixel value or the value of, for example, the skewness of one or more pieces of multi-valued data D3_1 to D3_*n* of an area where a droplet is present, among the plurality of multi-valued data D3_1 to D3_*n*, the flight states of the droplet DR may be classified.

In addition, the ejection state determination method according to the present embodiment further includes the determining step S40, as mentioned above. In the determining step S40, it is determined whether the value indicated by the determination information D4 satisfies a predetermined condition, and an ejection state is determined based on a result of the determination. Therefore, the ejection state may be determined.

Specifically, as described above, the determination information D4 includes the standard deviation information D4*d*, and, in the ejection state determination method according to the present embodiment, in the determining step S40, if the standard deviation of the plurality of pieces of multi-valued data D3_1 to D3_*n* is smaller than the threshold value, it is determined that the ejection state is normal. Therefore, whether the ejection state is good or not may be determined by using the determination standard deviation.

In addition, as described above, the determination information D4 includes the skewness information D4*e*, and, in the ejection state determination method according to the present embodiment, in the determining step S40, if the absolute value of the skewness of the plurality of pieces of multi-valued data D3_1 to D3_*n* is smaller than the threshold value, it is determined that the ejection state is normal. Therefore, whether the ejection state is good or not may be determined by using the skewness.

Furthermore, as described above, the determination information D4 includes the kurtosis information D4*f*, and, in the ejection state determination method according to the present embodiment, in the determining step S40, if the kurtosis of the plurality of pieces of multi-valued data D3_1 to D3_*n* is greater than the threshold value, it is determined that the ejection state is normal. Therefore, whether the ejection state is good or not may be determined by using the kurtosis.

In addition, the ejection state determination method according to the present embodiment further includes the receiving step S30, as mentioned above. In the receiving step S30, the user is notified of the determination information D4, and an input result of the user in response to the notification is received.

Therefore, the determination information D4 may be provided to the user and a determination result of the user for the determination information D4 may be received as an input result. In addition, a received result in the receiving step S30 may be used in the determining step S40.

Here, as mentioned above, the determination information D4 includes the first determination information D4_1 and the second determination information D4_2. Then, in the ejection state determination method according to the present embodiment, in the receiving step S30, switching is available between a state where a user is notified of the first determination information D4_1 and a state where the user is notified of the second determination information D4_2. Therefore, the user may be notified selectively of the information desired by the user.

In addition, as described above, the first obtaining step S10 captures an image of the droplet DR ejected from one nozzle N selected from the plurality of nozzles N against a background of the light source 500, and removes noise of the plurality of pieces of multi-valued data D3_1 to D3_*n* using the background image of the image capturing. Therefore, the accuracy of the determination information D4 may be enhanced.

The ejection state determination method described above is performed using the ejection state determination apparatus 400, as described above. The ejection state determination apparatus 400 includes the first obtainer 451 that performs the first obtaining step S10 and the second obtainer 452 that performs the second obtaining step S20. In the ejection state determination apparatus 400 described above, since the ejection state determination method described above is performed, a plurality of elements regarding the stability of ejection may be determined simply while the man-hours and ink consumption are reduced.

The ejection state determination apparatus 400 is implemented using the program PRG, which is an example of the ejection state determination program, as described above. The program PRG causes a computer to execute the first obtaining step S10 and the second obtaining step S20. With the program PRG described above, the ejection state determination method described above is executed, and therefore a plurality of elements regarding the stability of ejection may be determined simply while the man-hours and ink consumption are reduced.

In addition, the determination information may include the first determination information and the second determination information, and the ejection state may be determined in accordance with a combination of the first determination information and the second determination information.

7. Modifications

Each form illustrated above may be modified in a variety of ways. Aspects of specific modifications applicable to the forms described above will be illustrated by way of example below. Two or more aspects selected arbitrarily from the illustrations given below may be combined as appropriate to the extent that they are not inconsistent with each other.

7-1. First Modification

In the forms described above, the aspect of using the background captured-image information D2 is illustrated, but the background captured-image information D2 may be omitted. In this case, the multi-valued image information D3 is obtained by suitably processing the target captured-image information D1. In addition, the light source 500 may be used or omitted as desired.

What is claimed is:

1. An ejection state determination method for determining an ejection state of a liquid ejecting head in which a plurality of nozzles for ejecting a liquid in a first direction are arranged in a second direction intersecting the first direction, the ejection state determination method comprising:

a first obtaining step of obtaining a plurality of pieces of multi-valued data of an image including a plurality of pixels by capturing, at one timing, an image of a droplet ejected from one nozzle selected from the plurality of nozzles, the first obtaining step further including:

capturing the image against a background of a light source; and removing noise from the plurality of pieces of multi-valued data using a background image corresponding to the background in the image;

a second obtaining step of obtaining determination information from the plurality of pieces of multi-valued data; and a determining step of:

determining whether a value indicated by the determination information satisfies a predetermined condition; and determining the ejection state based on a result of the determination, wherein the second obtaining step includes a calculating step of calculating the value indicated by the determination information based on all of the plurality of pieces of multi-valued data indicating the droplet from which the noise has been removed in the first obtaining step.

2. The ejection state determination method according to claim 1, wherein the value indicated by the determination information used in the determining step:

is the number of pixels among the plurality of pixels in each of which multi-valued data indicating the droplet from which the noise has been removed in the first obtaining step; and has a value greater than or equal to a predetermined value.

3. The ejection state determination method according to claim 1, wherein the determination information includes information on a virtual volume of a droplet.

4. The ejection state determination method according to claim 1, wherein the determination information includes information on an aspect ratio of a droplet.

5. The ejection state determination method according to claim 1, wherein the determination information includes information on a distribution of the plurality of pieces of multi-valued data.

6. The ejection state determination method according to claim 1, wherein the determination information includes information on a standard deviation calculated using all of the plurality of pieces of multi-valued data indicating the droplet from which the noise has been removed in the first obtaining step as a population.

7. The ejection state determination method according to claim 1, wherein the determination information includes information on a skewness of the plurality of pieces of multi-valued data.

8. The ejection state determination method according to claim 1, wherein the determination information includes information on kurtosis of the plurality of pieces of multi-valued data.

9. The ejection state determination method according to claim 1, wherein the determination information includes information on a standard deviation calculated using all of the plurality of pieces of multi-valued data indicating the droplet from which the noise has been removed in the first obtaining step as a population, and in the determining step, when the standard deviation is smaller than a threshold value, it is determined that the ejection state is normal.

10. The ejection state determination method according to claim 1, wherein the determination information includes information on a skewness of the plurality of pieces of multi-valued data, and in the determining step, when the skewness of the plurality of pieces of multi-valued data has an absolute value smaller than a threshold value, it is determined that the ejection state is normal.

11. The ejection state determination method according to claim 1, wherein the determination information includes information on kurtosis of the plurality of pieces of multi-valued data, and in the determining step, when the kurtosis of the plurality of pieces of multi-valued data is greater than a threshold value, it is determined that the ejection state is normal.

12. The ejection state determination method according to claim 1, further comprising:

a receiving step of notifying a user of the determination information and receiving an input result of the user in response to the notification.

13. The ejection state determination method according to claim 12, wherein the determination information includes first determination information and second determination information, and in the receiving step, switching is available between a state where a user is notified of the first determination information and a state where the user is notified of the second determination information.

14. The ejection state determination method according to claim 1, wherein the determination information includes first determination information and second determination information, the ejection state determination method further comprising:

determining the ejection state in accordance with a combination of the first determination information and the second determination information.

15. The ejection state determination method according to claim 1, wherein the first obtaining step obtains the plurality of pieces of multi-valued data of the image including the plurality of pixels by capturing the image of the droplet when ejection and light emission are performed once.

16. An ejection state determination apparatus for determining an ejection state of a liquid ejecting head in which a plurality of nozzles for ejecting a liquid in a first direction are arranged in a second direction intersecting the first direction, the ejection state determination apparatus comprising:

a first obtainer configured to obtain a plurality of pieces of multi-valued data of an image including a plurality of pixels by capturing, at one timing, an image of a droplet ejected from one nozzle selected from the plurality of nozzles, the first obtainer being further configured to:

capture the image against a background of a light source; and remove noise from the plurality of pieces of multi-valued data using a background image corresponding to the background in the image;

a second obtainer configured to obtain determination information from the plurality of pieces of multi-valued data; and a determiner configured to:

determine whether a value indicated by the determination information satisfies a predetermined condition; and determine the ejection state based on a result of the determination, wherein the second obtainer is further configured to calculate the value indicated by the determination information based on all of the plurality of pieces of multi-valued data indicating the droplet from which the noise has been removed by the first obtainer.

17. A non-transitory computer-readable storage medium storing an ejection state determination program for determining an ejection state of a liquid ejecting head in which a plurality of nozzles for ejecting a liquid in a first direction are arranged in a second direction intersecting the first direction, the ejection state determination program causing a computer to execute:

a first obtaining step of obtaining a plurality of pieces of multi-valued data of an image including a plurality of pixels by capturing, at one timing, an image of a droplet ejected from one nozzle selected from the plurality of nozzles, the first obtaining step further including:

capturing the image against a background of a light source; and removing noise from the plurality of pieces of multi-valued data using a background image corresponding to the background in the image;

a second obtaining step of obtaining determination information from the plurality of pieces of multi-valued data; and a determining step of:

determining whether a value indicated by the determination information satisfies a predetermined condition; and determining the ejection state based on a result of the determination, wherein the second obtaining step includes a calculating step of calculating the value indicated by the determination information based on all of the plurality of pieces of multi-valued data indicating the droplet from which the noise has been removed in the first obtaining step.

* * * * *